(12) United States Patent
Kakihara

(10) Patent No.: US 6,201,669 B1
(45) Date of Patent: Mar. 13, 2001

(54) MAGNETORESISTIVE ELEMENT AND ITS MANUFACTURING METHOD

(75) Inventor: Yoshihiko Kakihara, Niigata-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 09/208,388

(22) Filed: Dec. 9, 1998

(30) Foreign Application Priority Data

Dec. 9, 1997 (JP) .................................................. 9-339124

(51) Int. Cl.$^7$ .................................................. G11B 5/127
(52) U.S. Cl. .................................................. 360/313
(58) Field of Search ..................................... 360/313, 322

(56) References Cited

U.S. PATENT DOCUMENTS 5,869,963 * 2/1999 Saito et al. ............................ 360/126

FOREIGN PATENT DOCUMENTS 6-187615 * 7/1994 (JP) ........................................ 360/313

* cited by examiner

*Primary Examiner*—Allen T. Cao
(74) *Attorney, Agent, or Firm*—Brinks Hofer Gilson & Lione

(57) ABSTRACT

Both of decreasing the direct current resistance and flattening of the top face of the element can be simultaneously attained by forming a first lead layer under the bottom side of a laminated body as well as by reducing the film thickness of a second lead layer located at both sides of the laminated body. Excessive signals from outside of the area of the track width Tw are not picked up during regeneration operation since the width of the laminated body is adjusted to be nearly equal to the track width Tw thereby enabling to attain a good regenerative characteristic.

19 Claims, 9 Drawing Sheets

MAGNETORESISTIVE ELEMENT AND ITS MANUFACTURING METHOD

BACKGROUND OF THE INVENTION

1. Field of the Invention

The present invention relates to a magnetoresistive element for regenerating a line of magnetically recorded information by taking advantage of an element in which electric resistance varies in response to changes of external magnetic fields. The present invention in particular relates to a magnetoresistive element and a method for producing the same, wherein flattening of the top face of the magnetoresistive element is attained without deteriorating regenerative characteristics.

2. Description of the Related Art

FIG. 7A is a cross section, in the vicinity of an ABS (Air Bearing Surface), of an AMR (Amisotropic Magnetoresistive) element for sensing recording magnetic field from a recording medium such as a hard disk device.

A so-called inductive type write magnetic head is laminated on this AMR element.

A soft magnetic layer (SAL) 20, a non-magnetic layer (SHUNT layer) 21 and a magnetoresistive layer (MR layer) 22 are laminated on the foregoing AMR layer from the bottom to the top and hard bias layers 24, 24 and lead layers 26, 26 are laminated on both side areas of this laminated body.

Interlayers 25, 25 for improving heat resistance are formed between the hard bias layer 24 and lead layer 26 with a protective layer 23 formed on the magnetoresistive layer 22. Both of the interlayers 25 and protective layer 23 are formed of Ta films.

Usually, a film of a Ni—Fe—Nb alloy is used for soft magnetic layer 20, a Ta film is used for the non-magnetic layer 21, a film of a Ni—Fe alloy is used for the magnetoresistive layer 22, a film of a Co—Pt alloy is used for the hard bias layer 24 and a Cr film is used for the lead layer 26.

The hard bias layer 24 functions as a magnet magnetized along the X-direction in this AMR element, a bias magnetic field being applied from hard bias layer 24 to the magnetoresistive layer 22 along the X-direction. A bias magnetic field is also applied from the soft magnetic layer 20 to the magnetoresistive layer 22 along the Y-direction. Applying bias magnetic fields to the magnetoresistive layer 22 along the X- and Y-directions allows magnetization changes of the magnetoresistive layer 22 to linearly respond against magnetic field changes.

A sensing current from the lead layer 26 is imparted to the magnetoresistive layer 22. Since the scanning direction of the recording medium such as a hard disk device is along the Z-direction, changes of the magnetization direction of the magnetoresistive layer 22 allows resistance values to be changed when a leakage magnetic field from the recording medium is applied along the Y-direction, which is sensed as voltage changes.

While an inductive head is laminated on the AMR element via a top gap layer (not shown in the drawing) as hitherto described, the inductive head is composed of a bottom core layer (top shield layer) 40, a top core layer 41 and a coil layer (not shown in the drawing).

When a recording current flows through the coil layer, a recording magnetic field is imparted to the top core layer 41 and bottom core layer 40, magnetic signals being recorded on the recording medium such as a hard disk device by a leakage magnetic field between the bottom core layer 40 and top core layer 41.

FIG. 9 is a cross section in the vicinity of the ABS of a spin-valve type thin film element (a spin-valve type thin film magnetic head) for sensing recording magnetic field from the recording medium such as a hard disk device. An inductive head composed of the bottom core layer 40 and the top core layer 41 shown in FIG. 7A is also laminated, though not shown in the drawing, on the spin-valve type thin film element.

The spin-valve type thin film element described above is a kind of GMR (giant magnetoresistive) element, having a better regeneration sensitivity than the AMR element for complying with the requirement of high density recording.

An underlayer 34 such as Ta, an antiferromagnetic layer 30, a fixed magnetic layer (a pinned magnetic layer) 31, a non-magnetic conductive layer 32 and a free magnetic layer 33 are laminated from the bottom to the top in this spin-valve type thin film element, and a protective layer 23 made of, for example, Ta is formed on the free magnetic layer 33 as in the AMR element shown in FIG. 7A.

Hard bias layers 24, 24 are formed, as in the AMR element shown in FIG. 7A, at both side areas of the laminated body from the underlayer 34 through the protective layer 23, lead layers 26, 26 being formed on these hard bias layers 24, 24 via the interlayers 25, 25.

A film of a Ni—Mn alloy, a film of a Ni—Fe alloy and a Cu film are usually used for the antiferromagnetic layer 30, pinned magnetic layer 31 and free magnetic layer 33, respectively.

The antiferromagnetic layer 30 and the pinned magnetic layer 31 are formed in contact relation with each other as shown in the drawing. The pinned magnetic layer 31 is put into a single magnetic domain state by exchange magnetic coupling at the interface with the antiferromagnetic layer 30, the magnetization direction of which being fixed along the Y-direction.

The magnetization direction of the free magnetic layer 33 is aligned along the X-direction by being affected by the hard bias layers 24, 24 magnetized along the X-direction.

A static current (sensing current) is imparted from the lead layers 26, 26 to the pinned magnetic layer 31, non-magnetic conductive layer 32 and free magnetic layer 33 in this spin-valve type thin film element. Since the scanning direction of the recording medium such as a hard disk device is along the Z-direction, magnetization of the free magnetic layer turns from the X-direction to the Y-direction when the leakage magnetic field from the recording medium is applied along the Y-direction. Electric resistance varies depending on the relation between changes of the magnetization direction in the free magnetic layer 33 and the pinned magnetization direction of the pinned magnetic layer 31. The leakage magnetic field from the recording medium is sensed due to voltage changes based on this electric resistance change.

Meanwhile, the film thickness of the leading layer 26, formed on both side areas of the laminated body from the soft magnetic layer 20 through the protective layer 23 as shown in FIG. 7A, is very thick in order to reduce the direct current resistance (DCR) of the AMR element. Small direct current resistance allows the sensing output to be large, improving the regenerative characteristics.

However, the overall thickness of the both side areas comprising the hard bias layer 24, interlayer 25 and lead layer 26 becomes thicker than the overall thickness of the laminated body (the layer from the soft magnetic layer 20 through the protective layer 23) when the film thickness of the lead layer 26 is made thick, resulting in a distorted configuration of the top face of the AMR element as shown in FIG. 7A.

Consequently, the bottom core layer 40 to be formed on the AMR element is deposited as a bent layer following the undulation of the top face of the AMR element as shown in FIG. 7A, also causing a distortion of the top core layer 41 in confronting relation over the bottom core layer 40 via a magnetic gap G.

When the portions of the bottom core layer 40 and top core layer 41 being in a confronting relation with each other via the magnetic gap G are distorted as shown in FIG. 7A, the recording patterns 42, 43 written on the recording medium becomes non-linear as shown in FIG. 7B with bent portions at both ends. Non-linear recording of the signals on the recording medium as described above causes the following problems.

Supposing that the recording medium travels from the face to the back of the drawing to regenerate the signals in the recording pattern 42, the signals in the recording pattern 43 outside of the signals in the recording pattern 42 are simultaneously regenerated at near the both ends of the magnetoresistive layer 22 as shown in FIG. 7B, causing a problem that a good regenerative characteristic cannot be attained.

Furthermore, it is another problem that projections (burrs) are formed at the site making a contact with the laminated body in the lead layer 26 when lead layer 26 has a large film thickness.

FIG. 8A is a cross section of the AMR element representing the production process for producing the AMR element.

In this production process of the AMR element, a lift-off resist layer 27 is deposited on the protective layer 23 after depositing a laminated body comprising a soft magnetic layer 20, a non-magnetic layer 21, a magnetoresistive layer 22 and a protective layer 23 on the substrate. Then, both sides of the laminated body are shaved off so that the both side faces of the laminated body assume inclined faces.

The hard bias layer 24, interlayer 25 and lead layer 26 are deposited thereafter on the both side areas of the laminated body, each layer being also deposited on the resist layer.

When the lead layer 26 is formed with a large film thickness in order to reduce direct current resistance, the lead layer 28 formed on the resist layer also has a large film thickness, thereby the lead layer 26 is formed in continuity with the lead layer 28 as shown in FIG. 8A.

When the resist layer 27 is removed while these two lead layers are in continuity, a part of the lead layer 28 remains on the lead layer 26 as projections (burrs) 29. FIG. 8B shows the partially enlarged drawing of the b-area shown in FIG. 8A after removing the resist layer 27.

The same problem as described above occurs in the case of the spin-valve type thin film element shown in FIG. 9.

The lead layer 26 of the spin-valve type thin film element has a so large film thickness that the film thickness at the both side areas of the laminated body becomes larger than the film thickness of the laminated body hitherto described, causing a distortion on the top face of the spin-valve type thin film element. Consequently, the bottom core layer 40 of the inductive head and the top core layer 41 to be formed on the spin-valve type thin film element are also formed with distortions, causing a problem that signals cannot be linearly recorded on the recording medium.

It is also a problem that projections (burrs) 29 are liable to be formed in the lead layer 26 as seen in FIG. 8B owing to a large film thickness of the lead layer 26.

FIG. 10 and FIG. 11 is an another example showing the structure of the conventional spin-valve type thin film element.

The construction of the both side areas of the spin-valve type thin film element in FIG. 10 is different from that of the both side areas of the spin-valve type thin film element in FIG. 9.

In FIG. 10, a first lead layer 35 is firstly formed on both sides of the laminated body from the underlayer 34 through the protective layer 23, bias layer 36 and the second lead layer 37 being laminated on the first lead layer 35.

Since a distortion has been introduced in the spin-valve type thin film element shown in FIG. 10 as in the spin-valve type thin film element shown in FIG. 11, the bottom core layer 40 and top core layer 41 formed on the spin-valve type thin film element are also distorted.

The hard bias layer 36 is formed without making a contact with the inclined face of the laminated body in the spin-valve type thin film element shown in FIG. 10 but the first lead layer 35 is placed between the hard bias layer 36 and free magnetic layer 33. Accordingly, the free magnetic layer 33 is hardly affected by the bias magnetic field from the hard bias layer 36, thereby magnetization of the free magnetic layer is not properly aligned along the X-direction to readily generate Barkhausen noise.

While the spin-valve type thin film element shown in FIG. 11 has a largely different structure from the spin-valve type thin film element shown in FIG. 9 and FIG. 10, the principle of regeneration is quite the same. The reference numeral of each layer in FIG. 11 corresponds to the reference numerals of the respective layers in FIG. 9 and FIG. 10.

The top face of the spin-valve type thin film layer shown in FIG. 11 is formed with a distortion like the top face of the spin-valve type thin film element shown in FIG. 9 and FIG. 10. Therefore, these structures are not preferable.

Since the spin-valve type thin film element shown in FIG. 11 is not adjusted to a desired shape by etching after depositing the laminated body from the free magnetic layer 33 through the antiferromagnetic layer 30 but its width is formed to be longer than the track width Tw, noises are easily picked up from the area outside of the track width region Tw during the regeneration operation, causing a problem that improvement of the regenerative characteristic is impossible.

Although the top face of the magnetoresistive element is not flattened in the construction of each conventional magnetoresistive element hitherto described, the top face of the magnetoresistive element is flattened in the two conventional examples to be described hereinafter.

FIG. 12 and FIG. 13 are cross sections showing the structure of the AMR element.

As shown in FIG. 12, lead layers 51, 51 are formed on both sides of the insulation layer 50, and the soft magnetic layer 20, non-magnetic layer 21 and magnetoresistive layer 22 are continuously laminated on the top faces of the insulation layer 50 and lead layer 51.

The soft magnetic layer 20 and the non-magnetic layer 21 are formed on the insulation layer 50 followed by laminating the lead layer 51 and hard bias layer 52 on both sides of this laminated body in the magnetoresistive element shown in FIG. 13. The magnetoresistive layer 22 is formed on the top face of the non-magnetic layer 21 and hard bias layer 52.

The top face of the magnetoresistive layer 22 corresponding to the uppermost layer of the AMR element is flattened as shown in FIG. 12 and FIG. 13. Consequently, the bottom core layer 40 and top core layer 41 formed on this AMR element are aligned in parallel relation to the soft magnetic layer 20, non-magnetic layer 21 and magnetoresistive layer 22. Therefore, the signals are almost linearly recorded on the recording medium to properly regenerate the signals by the AMR element.

Meanwhile, the magnetoresistive layer 22 is deposited on the top face of the non-magnetic layer 21 and elongated onto the hard bias layer in the AMR element shown in FIG. 12 and FIG. 13 with a wider width of the magnetoresistive layer 22 than the track width Tw. Accordingly, It is quite possible that the magnetoresistive layer 22 picks up noises from the area outside of the track width Tw during regeneration operation, thereby deteriorating the regenerative characteristic.

As will be evident from the foregoing discussions, we cannot find no inventions in which the top face of the magnetoresistive element is flattened without deteriorating the regeneration characteristic.

SUMMARY OF THE INVENTION

The object of the present invention, carried out for solving the problems in the prior art, is to provide a magnetoresistive element in which the top surface of the magnetoresistive element was flattened without deteriorating regenerative characteristics, and a method for producing the same.

The present invention provides a magnetoresistive element comprising a laminated body including element in which electric resistance is varied in response to changes of external magnetic field and both side areas located at both sides of the laminated body, wherein said element reproduce magnetically recorded information, an insulation layer is formed under the laminated body and a first lead layer for imparting recording current to the elements is formed on both sides of the insulation layer in addition to forming the top face of the laminated body on the same plane as the top face of the both side areas.

It is preferable in the present invention that the width of the insulation layer is adjusted so as to be wider than the width of the laminated body to be deposited on the insulation layer.

The both side areas may be constructed of merely bias layers made of a permanent magnet or of a bias layer made of a permanent magnet and a second lead layer deposited on this bias layer in the present invention.

It is preferable in the present invention that a Ta film is deposited as an underlayer on the top face of the insulation layer and on the top face of the first lead layer formed on both sides of the insulation layer. The object of this underlayer is to serve as an orientation film and to improve heat resistance.

The first lead layer is preferably formed of Cr, or Cu or W may be used for the lead layer instead of Cr.

The laminated body described above is a so-called AMR element composed of a magnetoresistive layer and a soft magnetic layer laminated via a non-magnetic layer and in the present invention. The structure is illustrated in FIG. 1.

The laminated body according to the present invention is a so-called spin-valve type thin film element composed of the antiferromagnetic layer, the pinned magnetic layer formed in contact with this antiferromagnetic layer, the magnetization direction being fixed by exchange anisotropic magnetic field with the antiferromagnetic layer, and the free magnetic layer formed over and/or under the pinned magnetic layer via a non-magnetic conductive layer, magnetization of which being aligned by the bias magnetic field from the bias layer so as to cross with the magnetization direction of the pinned magnetic layer. The structure is illustrated in FIG. 3.

It is preferable that, when the antiferromagnetic layer, the pinned magnetic layer, the non-magnetic conductive layer and the free magnetic layer are laminated from the bottom to the top in the laminated body, the antiferromagnetic layer is elongated beyond both sides of the pinned magnetic layer, non-magnetic conductive layer and free magnetic layer, a bias layer being formed on the antiferromagnetic layer. More preferably, a metal film with a body-centered cubic structure and having an orientation along the (100) direction is formed between the antiferromagnetic layer and bias layer. This structure is illustrated in FIG. 4.

The metal film is preferably formed of either one or more of Cr, Ti, Mo and $W_{50}Mo_{50}$.

The present invention provides a method for producing a magnetoresistive element comprising the steps of:
forming an insulation layer on the bottom gap layer, additionally forming a lift-off resist layer on the insulation layer;
shaving off the insulation layer not covered with the lift-off resist layer;
depositing a first lead layer on the portion where the insulation layer has been removed in the foregoing step with a height comparable to the surface of the remaining insulation layer followed by removing the resist layer; and
forming a laminated body including elements the electric resistance of which is varied in response to the changes of the external magnetic field on the insulation layer.

Flattening of the top face of the magnetoresistive element was made possible in the present invention without increasing the direct current resistance, examples of the structure being embodied in FIG. 1, FIG. 3, FIG. 4, FIG. 5 and FIG. 6.

The construction of the magnetoresistive element according to the present invention is featured in that the film thickness of the laminated body including the elements in which electric resistance varies in response to changes of the external magnetic field is adjusted to be nearly equal to the film thickness of the side areas located at both sides of the laminated body.

Although the both side areas are composed of a bias layer made of a permanent magnet and a lead layer (the second lead layer), the lead layer that has been formed into a thick film is especially formed into a thin film in the present invention so that the overall film thickness as a sum of the film thickness of the bias layer and the film thickness of the lead layer is adjusted to be approximately equal to the film thickness of the laminated body. The both side areas may be composed of merely the bias layer in the present invention with the proviso that the film thickness of the bias layer becomes almost equal to the film thickness of the laminated body.

However, there will be a problem that the direct current resistance (DCR) becomes larger than that in the conventional art where the film thickness of the both side areas is formed to be larger than the film thickness of the laminated body when the film thickness of the both side areas is adjusted to be the same order as the film thickness of the laminated body.

Accordingly, a lead layer (a first lead layer) is particularly provided under the laminated body in the present invention in order to reduce the direct current resistance. Providing this first lead layer allows the direct current resistance to be diminished.

As hitherto described, the film thickness of the both side areas located at both sides of the laminated body is adjusted to be approximately equal to the film thickness of the laminated body in the present invention to reduce the overall film thickness of the film to be deposited on the lift-off resist layer in forming the both side areas, thereby preventing undesirable projections (burrs) from being generated at both side areas.

According to the present invention, the laminated body is shaved into a desired configuration after deposition to adjust the width of the laminated body to be approximately the track width Tw. Accordingly, excess noises are never picked up from the area outside of the track width Tw during regeneration operation contrary to the cases shown in FIG. 11, FIG. 12 and FIG. 13 where the elements in which the electric resistance is changed are formed to be wider than the track width Tw, enabling to attain a good reproduction characteristic.

BRIEF DESCRIPTION OF THE DRAWINGS

FIG. 7A is a cross section of the structures of the conventional AMR element and inductive head viewed from the ABS face side while

FIG. 8A is a cross section of the AMR element representing a step of the production process of the AMR element shown in FIG. 5A while

DESCRIPTION OF THE PREFERRED EMBODIMENT

Figure 1:
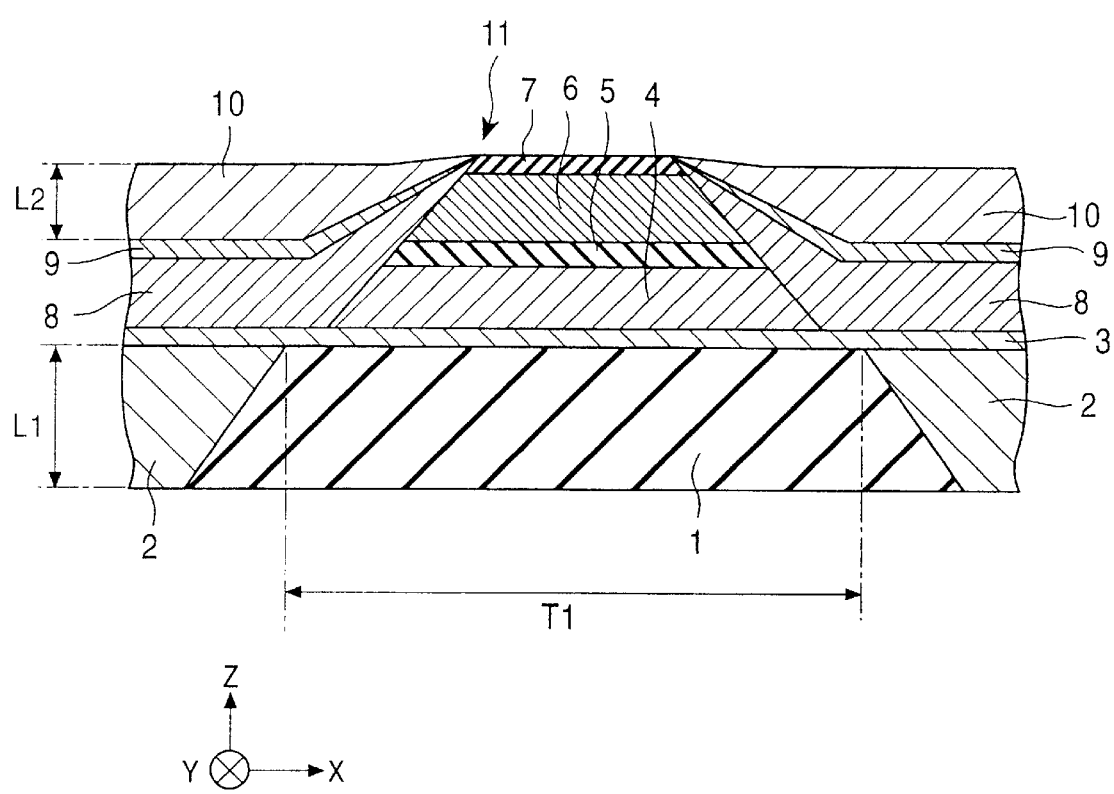
FIG. 1 is a cross section of the structure of the AMR element according to the first embodiment of the present invention viewed from the ABS face side.

FIG. 1 is a cross section of the structure of the AMR element according to the embodiment of the present invention viewed from the ABS face side. Only the central portion of the element elongating along the X-direction is shown by a broken line in FIG. 1.

The thin film magnetic head in the present invention is a so-called MR/inductive head composite type thin film magnetic head formed of a read head mainly composed of an AMR element for sensing the recording magnetic field of the recording medium and an inductive head constructed of a core layer and a coil layer on this read head. The thin film magnetic head is provided at the railing side end portion of a floating type slider provided in the hard disk device.

A bottom shield layer (not shown in the drawing) made of, for example, a Ni—Fa alloy and a bottom gap layer (not shown in the drawing) made of $Al_2O_3$ are laminated in the read head described above the AMR element shown in FIG. 1 being laminated on this gap layer.

The reference numeral 1 indicated in FIG. 1 corresponds to an insulation layer formed of, for example, $SiO_2$ and $AlO_3$. The both side faces of the insulation layer 1 assume inclined faces and the first lead layers 2, 2 are formed on both sides of the insulation layer 1. The insulation layer 1 and the first lead layer 2 are formed to have the same film thickness L1 with each other, the top face of the insulation layer 1 and the top layer of the first lead layers 2 being formed on the same plane.

It is preferable that the first lead layers 2 is formed of Cr (chromium), or it may be formed of Cu (copper) or W (tungsten) instead of Cr.

An underlayer 3 formed of Ta is deposited on the top faces of the insulation layer 1 and first lead layer 2. This underlayer 3 serves for improving heat resistance as well as an orientation film.

A laminated body 11 prepared by laminating a soft magnetic layer (a soft adjacent layer; SAL) 4, a nonmagnetic layer (SHUNT layer) 5, a magnetoresistive layer (MR layer) 6 and a protective layer 7 is formed on the underlayer 3.

The soft magnetic layer 4 is formed of a film of a Ni—Fe—Nb alloy, the non-magnetic layer 5 is formed of a Ta film, the magnetoresistive layer 6 is formed of a film of a Ni—Fe alloy and the protective layer 7 is formed of a Ta film.

A second lead layer 10 is formed on both side areas of the laminated body 11 via a hard bias layer 8 and an interlayer 9. The second lead layer 10 has a film thickness of L2.

The hard bias layer 8 is formed of, for example, a film of a Co—Pt (cobalt-platinum) alloy or a film of a Co—Cr—Pt (cobalt-chromium-platinum) alloy while the interlayer 9 is formed of a To film. The second lead layer 10 is formed of, like the first lead layer 2, Or, Cu or W. The interlayer 9 is provided in order to improve heat resistance.

The hard bias layer 8 serves as a magnet magnetized along the X-direction in this AMR element, a bias magnetic field being imparted along the X direction from this hard bias layer 8 to the magnetoresistive layer 6. A hard bias magnetic field is also applied from the soft magnetic layer to the magnetoresistive layer 6 along the Y-direction. Applying a hard bias layer to the magnetoresistive layer 6 along the X- and Y-directions allows a linear relation between resistance change and variation of magnetic field to be maintained in the magnetoresistive characteristic (R—H characteristic) in the magnetoresistive layer 6.

A recording current is imparted from the first lead layer 2 and second lead layer 10 to the magnetoresistive layer 6. Resistance of the magnetoresistive layer 6 varies when a magnetic field is applied from the recording medium along the Y-direction, obtaining a sensing current based on this resistance change.

The second lead layer 10 formed on both side areas of the laminated body 11 is formed with a film thickness L2 as hitherto described in the present invention in order to adjust the overall film thickness as a sum of the film thicknesses of the hard bias layer 8, interlayer 9 and second lead layer 10 to be approximately equal to the film thickness of the laminated body 11. Accordingly, the top face of the laminated body 11 and the top face of the second lead layer 10 are formed on the same plane with each other, realizing flattening of the top face of the AMR element.

Since the film thickness of the both side areas of the laminated body 11 was adjusted to be approximately the same as that of the laminated body 11, the possibility for the second lead layer 10 to be formed in continuity with the lead film formed on the lift-off resist layer during deposition of the second lead layer 10 is lowered.

Figure 8A:
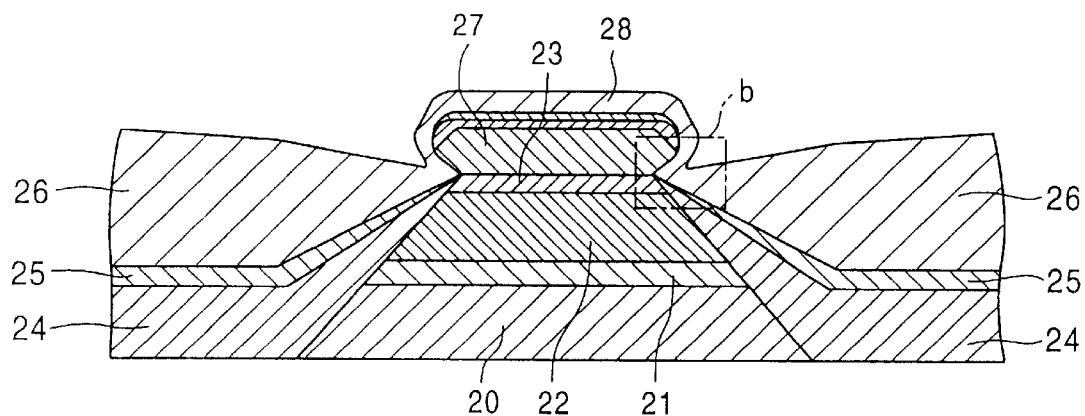

Consequently, projections (burrs) are less liable to be formed as compared with the conventional example (see FIG. 8).

However, there arises another problem in the present invention that the direct current resistance (DCR) becomes large because the second lead layer 10 was formed with a thinner film thickness of L2 than that of the conventional example and the overall film thickness of the both side areas of the laminated body is adjusted to be smaller than the conventional example.

For the reasons described above, an insulation layer 1 is formed under the laminated body 11 along with the first lead layers 2 formed on both sides thereof to reduce the direct current resistance. Making the direct current resistance small allows the sensing output to be large, thus improving the regenerative characteristic.

The second lead layer 10 should not be always provided on both sides of the laminated body in the present invention. In other words, merely the hard bias layers 8 may be formed on both side areas of the laminated body 11 so that the film thickness of the hard bias layers 8 becomes approximately equal to the film thickness of the laminated body 11 to flatten the top face of the AMR element. However, the lead layer 2 to be formed under the laminated body 11 should be formed to have a larger film thickness than L1 for reducing the direct current resistance.

It is preferable in the present invention that the insulation layer 1 is formed to have a width T1 wider than the width of the laminated body 11 (track width Tw).

When the insulation layer 1 is formed to have a width T1 narrower than the width of the laminated body 11, the distance between the first lead layers 2 and 2 formed on both sides of the insulation layer 1 becomes shorter than the track width Tw.

While the recording current flows in the order of the first lead layer 2—the magnetoresistive layer 6—the first lead layer 2, the recording current only flows through an area of the magnetoresistive layer 6 having a width narrower than the track width Tw when the distance between the first conductive layers 2 and 2 is shorter than the width of the laminated body 11 (track width Tw) since the recording current tend to flow through the shortest path. Consequently, there arises a problem that the signals recorded within the track width Tw of the recording medium cannot be properly regenerated.

Figure 12:
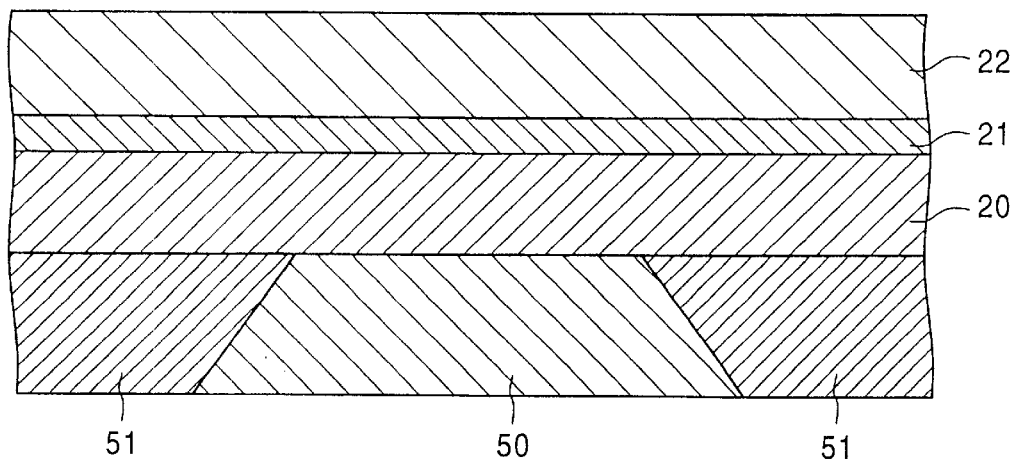
FIG. 12 is a cross section of the structure of another conventional AMR element viewed from the ABS face side.
Figure 13:
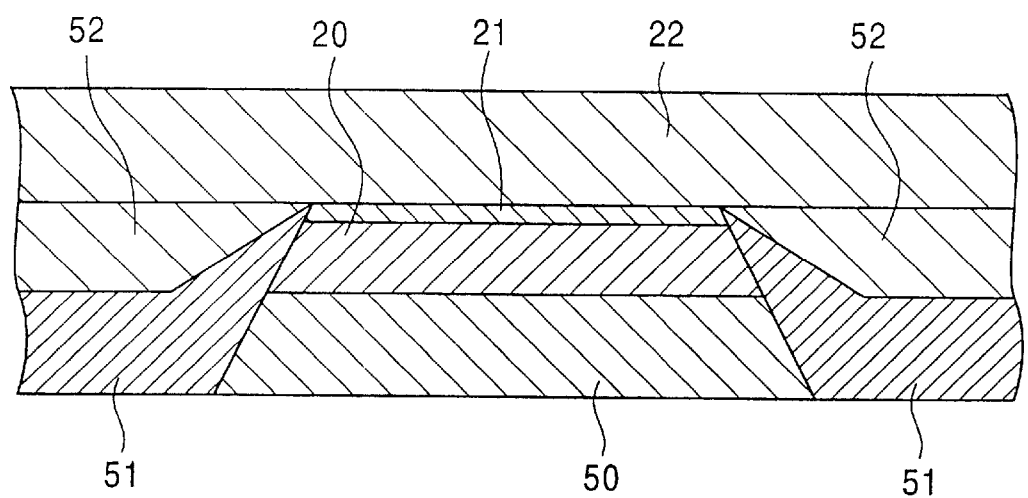
FIG. 13 is a cross section of the structure of the other conventional AMR element viewed from the ABS face side.

Therefore, the width T1 of the insulation layer 1 is adjusted in the present invention to be wider than the width of the laminated body 11. The laminated body 11 is formed into a given shape (a trapezoid) in the present invention so that the width of the magnetoresistive layer 6 becomes approximately equal to the track width Tw. Accordingly, the magnetoresistive element does not pick up noises from the area outside of the track width Tw in contrast to the magnetoresistive element 22 shown in FIG. 12 and FIG. 13 in which the width is wider than the track width Tw, thereby arising no problem of deteriorating the regenerative characteristic.

However, the configurations of the insulation layer 1 and the first lead layer 2 are not limited to the shape shown in FIG. 1.

For example, the insulation layer 1 may assume the shape shown in FIG. 2 to be described hereinafter.

The method for producing the AMR element will be described hereinafter referring to FIG. 2.

Figure 2A:
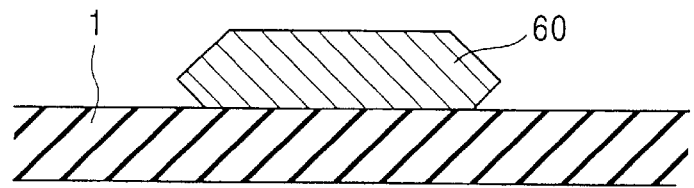
FIGS. 2A to D are cross sections showing the production process of the insulation layer of the magnetoresistive element according to the present invention and the first lead layer to be formed on both sides of the insulation layer.

An insulation layer 1 is deposited on the bottom gap layer (not shown in the drawing) as shown in FIG. 2A, followed by depositing a lift-off resist layer 60 with a given width on the insulation layer 1.

Figure 2B:
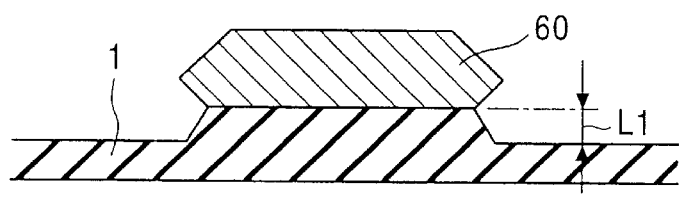

Then, the portion of the insulation layer 1 not covered with the resist layer 60 is shaved off to a depth of L1 by ion milling (see FIG. 2B).

Although all of both sides of the insulation layer 1 are not shaved to form inclined faces but bottom face of the insulation layer 1 is formed by being elongated up to both side areas in FIG. 2B, the both sides of the insulation layer 1 may be completely shaved off into inclined faces as in the insulation layer 1 in FIG. 1 to form the insulation layer 1 into a trapezoid.

Figure 2C:
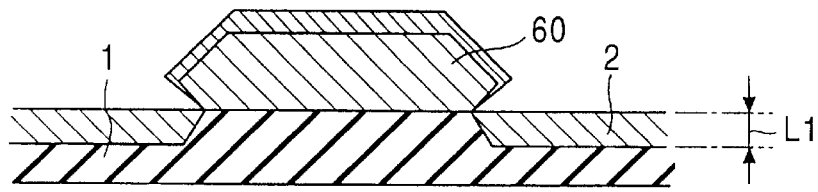
Figure 2D:
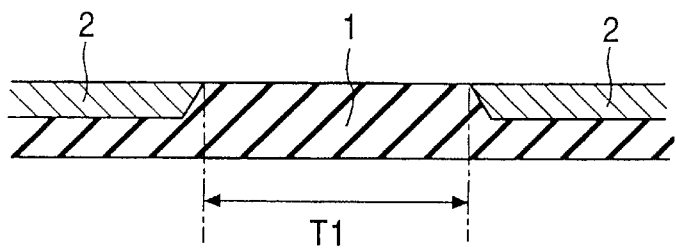

The first lead layer 2 with a film thickness of L1 is deposited on both sides of the insulation layer 1 as shown in FIG. 2C followed by removing the resist layer 60 (see FIG. 2D).

Then, the surface of the first lead layer 2 is bombarded by ion-milling or a reverse sputtering method before removing the underlayer (see FIG. 1) to keep an electric continuity (elimination of oxide layers).

In the next step, the underlayer 3 shown in FIG. 1 is deposited on the insulation layer 1 and on the first lead layer 2, followed by continuously depositing the soft magnetic layer 4, non-magnetic layer 5, magnetoresistive layer 6 and protective layer 7 on the underlayer 3 to form the laminated body 11.

A lift-off resist layer (not shown in the drawing) with a narrower width than the width T1 of the insulation layer 1 is formed thereafter on the protective layer 7 and the both side faces of the laminated body 11 are shaved off so as to assume inclined faces. The width of the laminated body 11 should be adjusted approximately to the track width Tw.

Then, the hard bias layer 8 and interlayer 9 are deposited on the both side areas of the laminated body 11. The second lead layer is finally deposited with a film thickness of L2 so that the overall film thickness as a sum of the film thicknesses of the hard bias layer 8, interlayer 9 and second lead layer 10 becomes approximately equal to the film thickness of the laminated body 11. The AMR element with a configuration as shown in FIG. 1 is completed by removing the resist layer.

Figure 3:
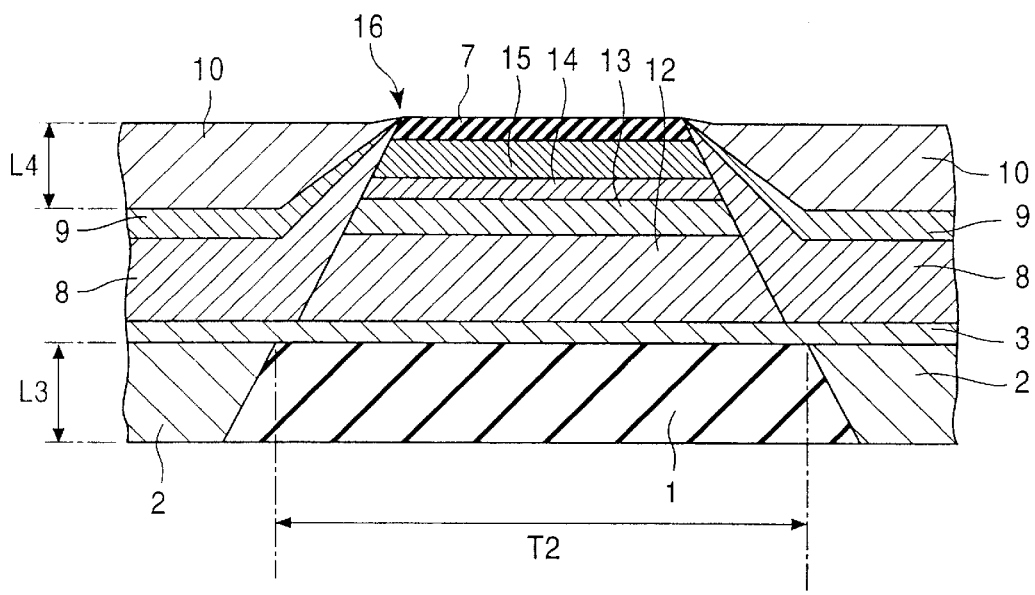
FIG. 3 is a cross section of the structure of the spin-valve type thin film element according to the second embodiment of the present invention viewed from the ABS face side.

FIG. 3 is a cross section of the structure of the spin-valve type thin film element according to the embodiment of the present invention viewed from the ABS face side. Only the central portion of the element elongating along the X-direction is indicated in FIG. 3 by a broken line.

The thin film magnetic head including the spin-valve type thin film element shown in FIG. 3 corresponds to a so-called Mr/inductive composite type thin film magnetic head prepared by laminating a read head mainly composed of the spin-valve type thin film element and a write inductive head.

The insulation layer 1 and the first lead layers 2, 2 are formed, like the AMR element shown in FIG. 1, under the laminated body 16 in this spin-valve type thin film element. Both of the insulation layer 1 and the first lead layer 2 have the same film thickness of L1 and the top face of the insulation layer 1 and the top face of the first lead layer 2 lies on the same plane with each other. The production methods of the insulation layer 1 and the first lead layer 2 are the same as the methods shown in FIG. 2.

An underlayer 3 for improving heat resistance that serves as an orientation film is formed on the top faces of the insulation layer 1 and first lead layer 2.

Each layer of the laminated body 16 to be formed on the underlayer 3 will be described hereinafter.

An antiferromagnetic layer 12 and a fixed magnetic layer (a pinned magnetic layer) 13 are laminated on the underlayer 3. By subjecting the laminated body of the antiferromagnetic layer 12 and a pinned magnetic layer 13 to heat treatment in a given intensity of the magnetic field, an exchange anisotropic magnetic field is obtained at the interface between the both faces and the magnetization direction of the pinned magnetic layer 13 is fixed along the Y-direction (the height direction) forming a single magnetic domain.

A Pt—Mn (platinum-manganese) alloy is used for the antiferromagnetic layer 12 in the present invention. The Pt—Mn alloy has excellent characteristics as an antiferromagnetic material such as superior heat resistance to the FeMn alloy and a higher blocking temperature as well as high anisotropic exchange magnetic field.

X—Mn (X=Pd, Rh, Ru, Ir, Os) alloys or Pt—Mn—X' alloys (X'=Ni, Pd, Rh, Ru, Ir, Cr, Co) alloys may be used for the antiferromagnetic layer 12 instead of the Pt—Mn alloy.

The pinned magnetic layer 13 is formed of a Ni—Fe (nickel-iron) alloy, CoFe (cobalt-iron) alloy, Co and Co—Fe—Ni (cobalt-iron-nickel) alloy.

A non-magnetic lead layer 14 made of a low electric resistance material such as Cu is formed on the pinned magnetic layer 13, on which a free magnetic layer 15 and a protective layer 7 made of Ta are further laminated. The free magnetic layer 15 is formed of the magnetic material used in the foregoing pinned magnetic layer 13.

Hard bias layers 8, 8 are formed on both sides of the laminated body 16 as shown in FIG. 3 and a second lead layers 10, 10 are formed on the hard bias layers 8 via interlayers 9, 9. The second lead layer 10 is formed with a film thickness of L4 and the overall film thickness as a sum of the film thicknesses of the hard bias layers 8, interlayers 9 and second lead layer 10 is adjusted to approximately the same as the film thickness of the laminated body 16.

The hard bias layers 8, 8 are formed of, for example, a CoPt (cobalt-platinum) alloy or a Co—Cr—Pt (cobalt-chromium-platinum) alloy. The second lead layers 10, 10 are formed of Cr (chromium), W (tungsten) and Cu (copper).

The hard bias layers 8, 8 are magnetized along the X-direction (track direction) and magnetization of the free magnetic layer 15 is aligned along the X-direction by being affected by the hard bias layers 8, 8.

A static current (a sensing current) is imparted from the first lead layer 2 and second lead layers 10 to the pinned magnetic layer 13, non-magnetic conductive layer 14 and free magnetic layer 15. When a magnetic field is applied from the recording medium along the Y-direction, the magnetization direction of the free magnetic layer 15 is turned from the X-direction to the Y-direction. Conduction electrons to be transferred from one layer to the other layer of the free magnetic layer 15 and pinned magnetic layer 13 are scattered at the interface between the non-magnetic conductive layer 14 and pinned magnetic layer 13 or at the interface between the non-magnetic lead layer 14 and free magnetic layer 15 to alter electric resistance, thereby fluctuating the static current and enabling to obtain a sensing output.

Reduction of direct current resistance is attempted in the present invention by forming the first lead layer 2 under the laminated body 16 in addition to flattening the top face of the spin-valve type thin film element by reducing the film thickness L4 of the lead layer 10 to be formed on both sides of the laminated body 16 to adjust the film thickness on the both side areas to approximately the same as the film thickness of the laminated body 16.

Figure 8B:
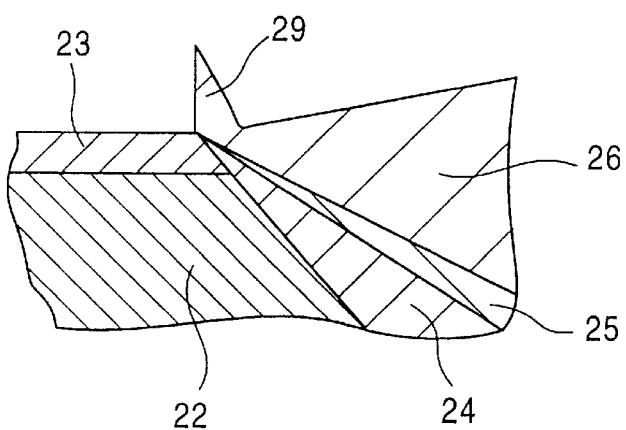
FIG. 8B is an enlarged cross section indicating the configuration of the b-area after removing the resist layer shown in FIG. 8A.
Figure 9:
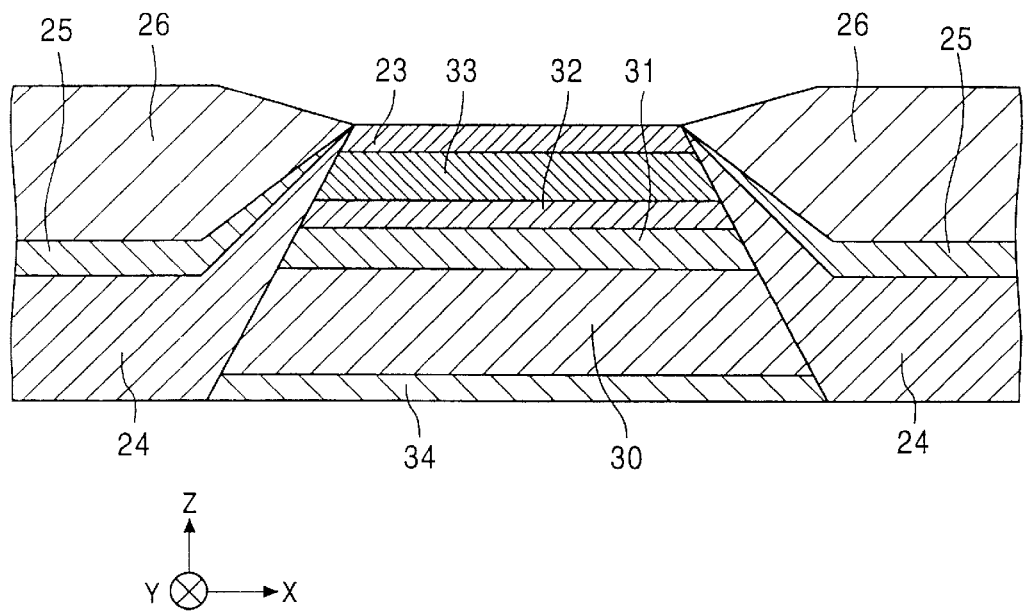
FIG. 9 is a cross section of the structure of a conventional spin-valve type thin film element viewed from the ABS face side.
Figure 10:
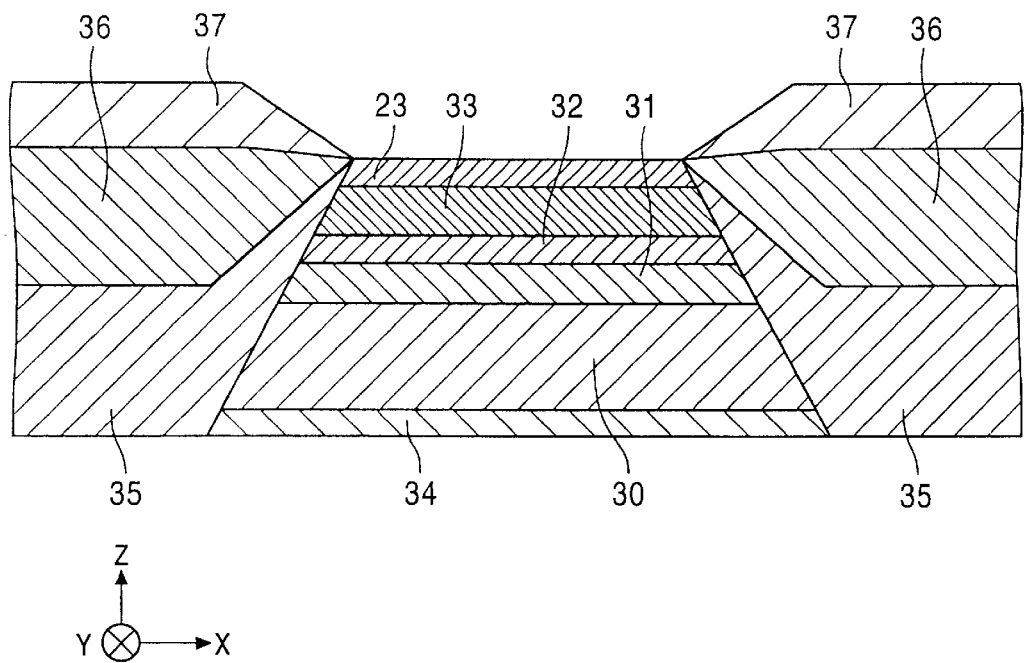
FIG. 10 is a cross section of the structure of another conventional spin-valve type thin film element viewed from the ABS face side.
Figure 11:
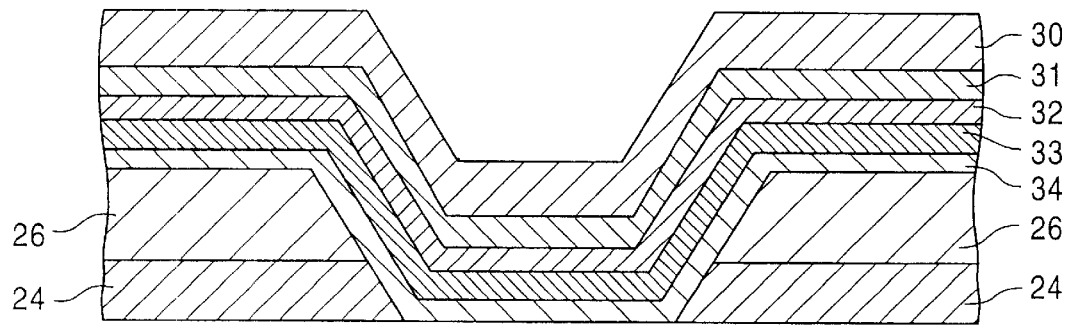
FIG. 11 is a cross section of the structure of the other conventional spin-valve type thin film element viewed from the ABS face side.

The overall film thickness of the multilayer film on the resist layer to be removed by lift-off can be thinned by adjusting the film thickness on the both side areas to approximately the same as the film thickness of the laminated body 16, consequently avoiding the defect that projections (burrs) appear on the second conductive layer 10 in the conventional art (see FIG. 8B).

Although the second lead layers 10 are formed on both side areas of the laminated body 16, merely the hard bias layers 8 may be formed on both side areas without forming the second conductive layers 10. However, the top face of the laminated body 16 should lie on the same plane as the top face of hard bias layers 8 by adjusting the film thickness of the hard bias layers 8 to approximately the same as the film thickness of the laminated body 16.

The insulation layer 1 is formed to have a width T2 wider than the width of the laminated body 16 (approximately the track width Tw). In other words, it is possible to allow the recording current imparted from the first lead layer 2 to the pinned magnetic layer 13, non-magnetic lead layer 14 and free magnetic layer 15 to flow through the entire track width (Tw) region because the distance between the first lead layers 2, 2 is wider than the width of the laminated body 16. Accordingly, the regenerative characteristics are never deteriorated.

While the antiferromagnetic layer 12 is formed of the Pt—Mn alloy in the present invention as hitherto described, the antiferromagnetic layer 12 formed of the Pt—Mn alloy can generate exchange anisotropic magnetic field at the interface between the antiferromagnetic layer 12 and pinned magnetic layer 13 even when the pinned magnetic layer 13 is formed on the antiferromagnetic layer 12 as shown in FIG. 3 or the pinned magnetic layer 13 is formed under the antiferromagnetic layer 12.

Although the antiferromagnetic layer 12, pinned magnetic layer 13, non-magnetic lead layer 14 and free magnetic layer 15 are laminated from the bottom to the top in FIG. 3, a spin-valve type thin film element in which the layers are inversely laminated, i.e. in the order of the free magnetic layer 15, non-magnetic conductive layer 14, pinned magnetic layer 13 and antiferromagnetic layer 12 from the bottom to the top, may be acceptable.

Figure 4:
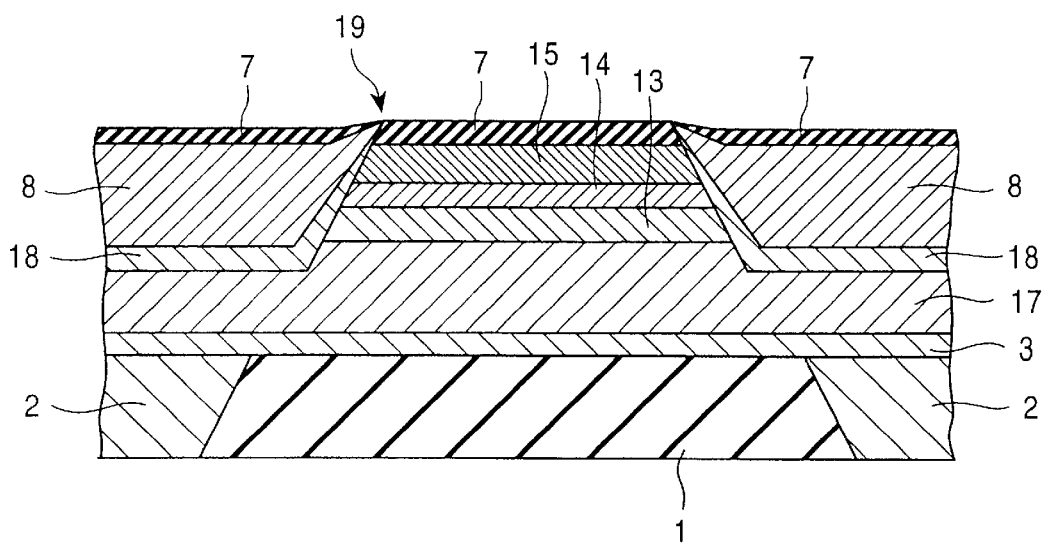
FIG. 4 is a cross section of the structure of the spin-valve type thin film element according to the third embodiment of the present invention viewed from the ABS face side.

When the layers are laminated in the order of the antiferromagnetic layer 12, pinned magnetic layer 13, non-magnetic conductive layer 14 and free magnetic layer 15 from the bottom to the top in the laminated body 16, the more preferable configuration is that shown in FIG. 4. The spin-valve type thin film element shown in FIG. 4 will be described hereinafter.

The insulation layer 1 and the first lead layer 2 formed on both sides of the insulation layer 1 are also formed under the laminated body 19 in the spin-valve type thin film element shown in FIG. 4 as in the spin-valve type thin film element shown in FIG. 3. Forming the first lead layer 2 allows direct current resistance to be reduced. The methods for producing the insulation layer 1 and the first lead layer 2 formed on both sides of the insulation layer 1 are the same as the methods indicated in FIG. 2.

The antiferromagnetic layer 17 to be formed at the lowest layer of the laminated body 19 is elongated to the both side areas beyond the pinned magnetic layer 13, non-magnetic lead layer 14 and free magnetic layer 15 formed on the antiferromagnetic layer 17.

In the method for producing the laminated body 19, five layers of from the antiferromagnetic layer 17 through the protective layer 7 are firstly deposited by sputtering followed by removing the both side portions of the layers by ion-milling to remain the pinned magnetic layer 13, non-magnetic conductive layer 14, free magnetic layer 15 and protective layer 7 at the center along the X-direction. The top face of the antiferromagnetic layer 17 is also shaved off as a result of etching during the process described above.

A metal film 18 to serve as a buffer film and an orientation film is formed on the top faces of both sides of the antiferromagnetic layer 17. Materials to assume a body-centered cubic structure (bcc structure) with (100) orientation is preferably used for this metal film, examples of them being Cr, W, Mo and $W_{50}Mo_{50}$. One or two or more kinds of the foregoing materials may be used for the metal film 18.

The hard bias layer 8 is formed on the metal film 18 as shown in FIG. 4, the protective layer such as a Ta film being further formed on the hard bias layer 8. The top face of the spin-valve type thin film element is flattened by properly adjusting the film thickness of the hard bias layer 8 and the film thickness of the protective layer 7 to allow the top face of the protective layer 7 to lie on the same plane as the top face of the laminated body 19.

Since the antiferromagnetic layer 17 is deposited throughout the entire top surface of the underlayer 3 in the spin-valve type thin film element shown in FIG. 4, the overall film thickness of the layers (the hard bias layer 8 and protective layer 7) to be formed on both sides of the laminated body 19 becomes thinner than the overall film thickness on both side areas of the spin-valve type thin film element shown in FIG. 3.

Accordingly, the structure shown in FIG. 4 further prevents projections (burrs) on the top face of the side areas from being generated.

The portion with a thicker film thickness of the hard bias layer 8 confronts both side faces of the free magnetic layer 15 or makes a contact with them by elongating only the antiferromagnetic layer 17 and forming the hard bias layer 8 on the antiferromagnetic layer 17.

Consequently, an intense bias magnetic field along the X-direction generated from the hard bias layer 8 is imparted to the free magnetic layer 15, properly aligning the free magnetic layer 15 along the X-direction. Accordingly, Barkhausen noises are hardly generated enabling to improve the regenerative characteristic.

While merely the hard bias layers 8 are formed on both sides of the laminated body in the spin-valve type thin film element shown in FIG. 4, the second lead layer 10 may be formed on the hard bias layers 8 as in the spin-valve type thin film element shown in FIG. 3. However, the hard bias layers 8 shown in FIG. 4 should be thin along with forming the second lead layer 10 on the hard bias layers 8 in order to allow the top face of the second lead layer 10 to lie on the same plane as the top face of the laminated body.

While the structures of the AMR element and spin-valve type thin film element were described based on the examples, the present invention is applicable to the magnetoresistive elements other than those hitherto described. For example, although the spin-valve type thin film element shown in FIG. 3 and FIG. 4 assume a so-called single spin-valve type thin film element, the constitution of the present invention may be applied for the dual spin-valve type thin film element having a higher rate of resistance change than the single spin-valve type thin film element.

Figure 5:
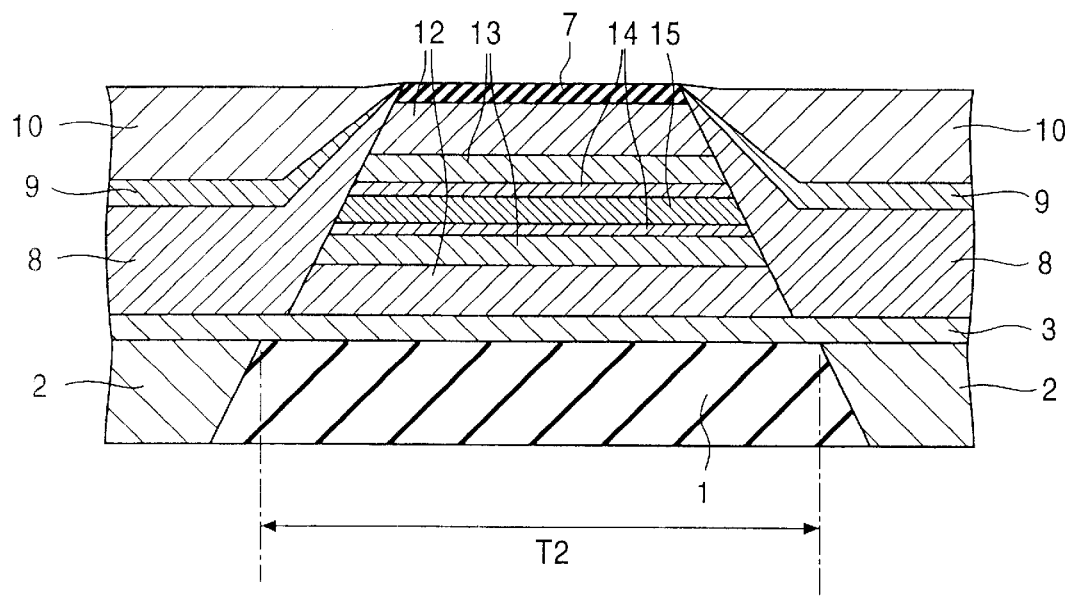
FIG. 5 is a cross section of the structure of the spin-valve type thin film element (dual spin-valve type thin film element) according to the fourth embodiment of the present invention viewed from the ABS face side.
Figure 6:
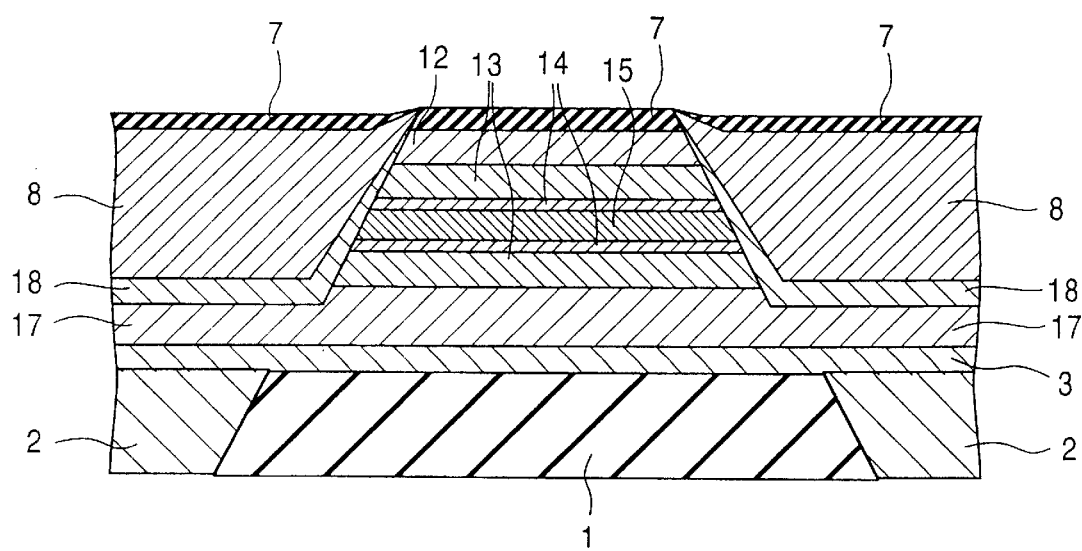
FIG. 6 is a cross section of the structure of the spin-valve type thin film element (dual spin-valve type thin film element) according to the fifth embodiment of the present invention viewed from the ABS face side.
Figure 7A:
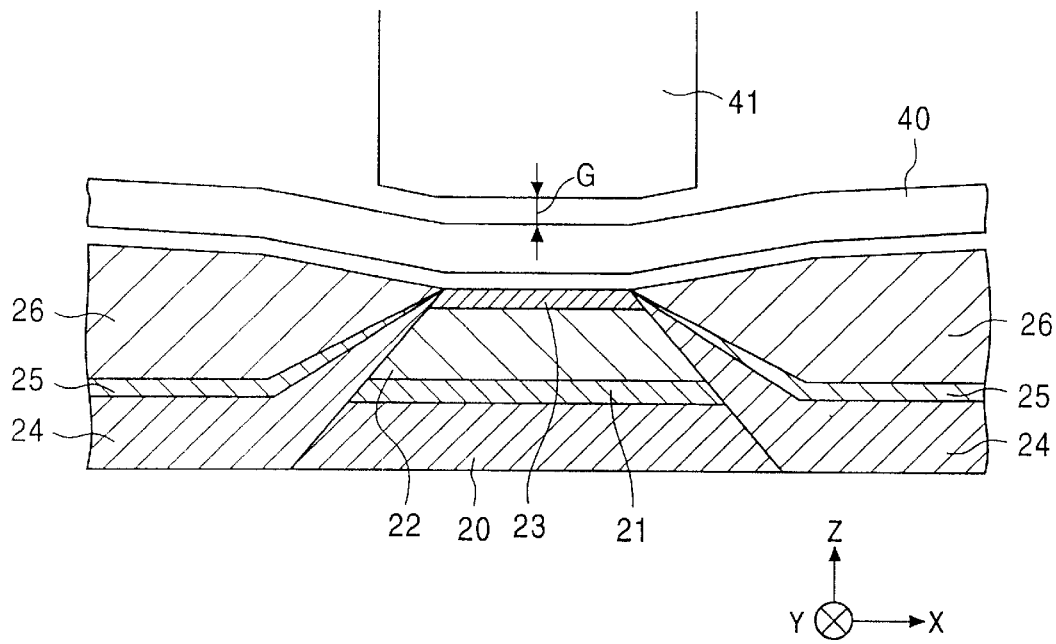
Figure 7B:
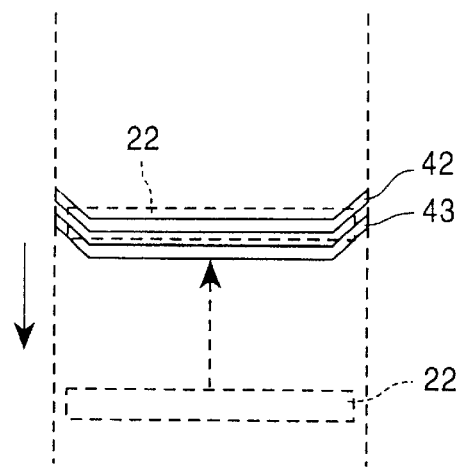
FIG. 7B is an image diagram indicating recording patterns when signals are recorded on the recording medium in the inductive head shown in FIG. 7A.

FIG. 5 and FIG. 6 are cross sections showing the structures of the dual spin-valve type thin film element according to the present invention.

The dual spin-valve type thin film element shown in FIG. 5 makes use of the single spin-valve type thin film element shown in FIG. 3 while the dual spin-valve type thin film element shown in FIG. 6 makes use of the single spin-valve type thin film element shown in FIG. 4.

The dual spin-valve type thin film element assumes a structure in which two sets of the non-magnetic conductive layer 14, pinned magnetic layer 13 and antiferromagnetic layer 12 (the antiferromagnetic layer at the bottom side is represented by the reference numeral 17 in FIG. 6) are laminated in this order downward and upward of the free magnetic layer 15 positioned at the center of the layers.

As hitherto described in detail, a lead layer (the first lead layer) is formed under the laminated body containing the elements in which electric resistance varies in response to the changes of the external magnetic field in the present invention. Flattening of the top face of the magnetoresistive element and reduction of the direct current resistance can be simultaneously attained by forming, or without forming, a thin lead layer (the second lead layer) on both sides of the laminated body.

Consequently, the core layer of the inductive head to be formed on the magnetoresistive element can be formed without any distortions, making it possible to record linear signals on the recording medium.

The film thickness on the both side areas of the laminated body is adjusted to be approximately equal to the film thickness of the laminated body for the purpose of attaining flattening of the top face of the magnetoresistive element. This construction allows the overall film thickness of the multilayer film deposited on the lift-off resist layer to be thinner than the film thickness of the conventional element through the production process, thereby preventing projections (burrs) from being generated in the both side areas after removing the resist layer.

Furthermore, since the laminated body is formed with a width approximately equal to the track width Tw in the present invention, there arises no problem that excessive noises are picked up from the area outside of the track width Tw.

According to the present invention as hitherto described in detail, a lead layer (the first lead layer) is formed under the laminated body containing elements in which electric resistance is varied in response to the changes of the external magnetic field, along with forming, or not forming, a thin film of a lead layer (the second lead layer) on both sides of the laminated body. Consequently, the film thickness of the both side areas located at both sides of the laminated body can be adjusted to approximately equal to the film thickness of the laminated body to simultaneously attain reduction of the direct current resistance and flattening of the top face of the magnetoresistive element.

The film thickness of the both side areas located at both sides of the laminated body is adjusted to approximately equal to the film thickness of the laminated body. This process prevent the multilayer film to be formed on the lift-off resist layer from being formed in continuity with the layers on both side areas, avoiding a part of the multilayer film formed on the resist layer from being remained as projections (burrs).

In addition, the laminated body is formed with approximately the same width as the track width in the present invention, so that there arises no problem that excess noises are picked up from the area outside of the track width Tw.

The distance between the first lead layers to be formed under the laminated body is adjusted to be wider than the width of the laminated body. Consequently, the recording current flowing from the first lead layer to the elements that cause voltage change in the laminated body is distributed throughout the elements, preventing the regenerative characteristic from being deteriorated.

What is claimed is:

1. A magnetoresistive element comprising:

a laminated body including an element in which electric resistance is varied in response to changes in an external magnetic field and both side areas located at both sides of the laminated body, said element reproducing recorded information;

an insulation layer formed under said laminated body; and a first lead layer to impart a recording current to said element formed on both sides of the insulation layer, a top face of said laminated body being formed on the same plane as a top face of said both side areas, wherein the laminated body comprises an antiferromagnetic layer, a pinned magnetic layer formed in contact with the antiferromagnetic layer, a magnetization direction of the pinned magnetic layer being fixed by an exchange anisotropic magnetic field with said antiferromagnetic layer, and a free magnetic layer formed one of over and under said pinned magnetic layer via a non-magnetic conductive layer, a magnetization of the free magnetic layer being aligned by a bias magnetic field from a bias layer to cross with the magnetization direction of the pinned magnetic layer.

2. A magnetoresistive element according to claim 1, wherein a width of the insulation layer is wider than a width of the laminated body.

3. A magnetoresistive element according to claim 1, wherein the both side areas are constructed of merely bias layers.

4. A magnetoresistive element according to claim 1, wherein the both side areas are constructed of a bias layer and a second lead layer deposited on this bias layer.

5. A magnetoresistive element according to claim 1, wherein a Ta film is deposited as an underlayer on a top face of the insulation layer and on a top face of the first lead layer formed on both sides of the insulation layer.

6. A magnetoresistive element according to claim 1, wherein the first lead layer is formed of Cr.

7. A magnetoresistive element according to claim 1, wherein the first lead layer comprises one of Cu and W.

8. A magnetoresistive element according to claim 1, wherein a metal film with a body-centered cubic structure and having an orientation along the (100) direction is formed between the antiferromagnetic layer and bias layer.

9. A magnetoresistive element according to claim 8, wherein the metal film comprises at least one of Cr, Ti, Mo and $W_{50}Mo_{50}$.

10. A magnetoresistive element according to claim 1, further comprising a recording magnetic head comprising an upper core layer, a lower core layer, a coil layer, and a magnetic gap between the upper core and the lower core, the recording magnetic head formed on the magnetoresistive element.

11. A magnetoresistive element according to claim 10, further comprising an upper shielding layer with an upper gap layer thereunder formed on the magnetoresistive element.

12. A magnetoresistive element according to claim 1, further comprising an upper shielding layer with an upper gap layer thereunder formed on the magnetoresistive element.

13. A magnetoresistive element comprising:

a laminated body including an element in which electric resistance is varied in response to changes in an external magnetic field and both side areas located at both sides of the laminated body, said element reproducing recorded information, the laminated body including a magnetoresistive layer laminated via a non-magnetic layer and a soft magnetic layer;

an insulation layer formed under the laminated body, a width of the insulation layer being wider than a width of the laminated body; and a first lead layer to impart a recording current to said element formed on both sides of the insulation layer, a top face of said laminated body being formed on the same plane as a top face of said both side areas, wherein the laminated body comprises an antiferromagnetic layer, a pinned magnetic layer formed in contact with the antiferromagnetic layer, a magnetization direction of the pinned magnetic layer fixed by an exchange anisotropic magnetic field with said antiferromagnetic layer, and a free magnetic layer formed one of over and under said pinned magnetic layer via a non-magnetic conductive layer, a magnetization of the free magnetic layer is aligned by a bias magnetic field from a bias layer to cross with the magnetization direction of the pinned magnetic layer, the both side areas include a bias layer and a second lead layer formed on both sides of the insulation layer, the top face of the laminated body and a top face of the second lead layer lies on the same plane, and the soft magnetic layer is formed between the insulation layer and the non-magnetic layer.

14. A magnetoresistive element according to claim 13, wherein a Ta film is deposited as an underlayer on the top face of the insulation layer and on a top face of the first lead layer formed on both sides of the insulation layer.

15. A magnetoresistive element according to claim 13, wherein the first lead layer is Cr.

16. A magnetoresistive element according to claim 13, said first lead layer comprising one of Cr and W.

17. A magnetoresistive element according to claim 13, further comprising a recording magnetic head comprising an upper core layer, a lower core layer, a coil layer, and a magnetic gap between the upper core and the lower core, the recording magnetic head formed on the magnetoresistive element.

18. A magnetoresistive element according to claim 16, further comprising a lower core layer with an upper gap layer thereunder formed on the magnetoresistive element.

19. A magnetoresistive element according to claim 13, further comprising an upper shielding layer with an upper gap layer thereunder formed on the magnetoresistive element.

* * * * *

UNITED STATES PATENT AND TRADEMARK OFFICE
CERTIFICATE OF CORRECTION

PATENT NO.    : 6,201,669 B1
DATED         : March 13, 2001
INVENTOR(S)   : Yoshihiko Kakihara It is certified that error appears in the above-identified patent and that said Letters Patent is hereby corrected as shown below:

<u>Column 18,</u>
Line 43, delete "claim 16," and substitute -- claim 17, -- in its place.

Signed and Sealed this

Twenty-eighth Day of May, 2002

Attest:

JAMES E. ROGAN
Attesting Officer    Director of the United States Patent and Trademark Office